United States Patent [19]

Goedderz et al.

[11] Patent Number: 5,115,551

[45] Date of Patent: May 26, 1992

[54] METHOD FOR FITTING A FLEXIBLE STRIP

[75] Inventors: Dieter Goedderz, Erkelenz; Markus Reuvers, Krefeld, both of Fed. Rep. of Germany

[73] Assignee: Draftex Industries, Limited, Edinburgh, Scotland

[21] Appl. No.: 763,869

[22] Filed: Sep. 20, 1991

Related U.S. Application Data

[60] Continuation of Ser. No. 661,462, Feb. 26, 1991, abandoned, which is a division of Ser. No. 460,285, Jan. 3, 1990, Pat. No. 5,031,293.

[30] Foreign Application Priority Data

Sep. 6, 1989 [GB] United Kingdom ................ 8920133

[51] Int. Cl.⁵ .............................................. B23P 11/00
[52] U.S. Cl. .................... 29/450; 29/243.58; 29/453
[58] Field of Search .............. 29/235, 243.5, 243.57, 29/243.58, 450, 451, 453, 514, 525; 414/744 A

[56] References Cited

U.S. PATENT DOCUMENTS

| | | | |
|---|---|---|---|
| 4,620,354 | 11/1986 | Hess et al. ........................ | 29/451 X |
| 4,653,166 | 3/1987 | Bright ............................... | 29/451 X |
| 4,902,549 | 2/1990 | Bright et al. ..................... | 29/514 X |
| 4,996,756 | 3/1991 | Bright et al. ..................... | 29/243.58 |

FOREIGN PATENT DOCUMENTS

| | | | |
|---|---|---|---|
| 3541865 | 6/1987 | Fed. Rep. of Germany ........ | 29/235 |
| 18182 | 1/1990 | Japan ..................................... | 29/235 |

*Primary Examiner*—Joseph M. Gorski
*Assistant Examiner*—Peter Dungba Vo
*Attorney, Agent, or Firm*—Leydig, Voit & Mayer

[57] ABSTRACT

The robot arrangement for mounting a sealing strip on a mounting flange comprises a robot hand supported at the end of a robot arm. The sealing strip is received by the robot hand at one point and driven through the hand to emerge at another point. Its emerging end is engaged by a right-angled guide finger. As the strip movement continues, this finger pivots and constrains the strip to follow a curved path around a guide roller. The robot arm then moves the robot hand towards the flange so that the curved strip engages the flange. Thereafter, the finger is accelerated by a motor out of engagement with the strip. The robot arm then drives the robot hand along the flange, thus laying the strip on to the flange.

1 Claim, 7 Drawing Sheets

METHOD FOR FITTING A FLEXIBLE STRIP

This is a continuation of copending application(s) Ser. No. 07/661,462 filed on Feb. 26, 1991 now abandoned which is a divisional of copending application(s) Ser. No. 460,285, filed on Jan. 3, 1990 now U.S. Pat. No. 5,031,293.

BACKGROUND OF THE INVENTION

The invention relates to apparatus and methods for fitting a flexible strip. For example, the strip may be a sealing strip which is required to be fitted around a door or other closable opening on a motor vehicle body.

BRIEF SUMMARY OF THE INVENTION

According to the invention, there is provided apparatus for use in mounting an elongate resilient channel-shaped strip on to a mounting flange or the like, comprising a portable body, strip drive means carried by the body and arranged to feed the strip longitudinally along a predetermined path which is fixed in relation to the body and the distal part of which is curved and external to the body, and guide means mounted on the body for receiving the initial end of the strip and guiding it along the said distal part of the path external to the body, the guide means comprising a guide finger pivotally mounted on the body and movable between first and second positions such that a guiding part thereof extending transversely to the distal part of the path moves immediately adjacent to that path and is resiliently contacted by the initial end of the strip and guides that end along the distal part of the path so that the strip presents the open mouth of its channel outwardly of the curve for presentation to and eventual mounting on the mounting flange as the body moves along the length of the flange.

According to the invention, there is also provided a method of mounting an elongate resilient channel-shaped strip on to a mounting flange or the like, comprising the steps of selecting a length of the strip, feeding the strip longitudinally towards the flange in a direction transverse to the length of the flange, constraining the initial end of the strip to follow a curved path so that the part of the strip immediately following the initial end presents the mouth of the channel to but spaced from the flange, moving the strip bodily towards the flange so that the said immediately following part of the strip embraces the flange but the initial end is clear of the flange, continuing to move the strip longitudinally and at the same time pressing it towards the flange so that the remainder of the strip embraces the flange, mechanically lifting the said immediately following part of the strip, pressing the initial end of the strip into embracing engagement with the flange and immediately adjacent to the final end of the strip on the flange, and then pressing on to the flange the mechanically lifted part of the strip.

DESCRIPTION OF THE DRAWINGS

Apparatus embodying the present invention, and methods according to the present invention for fitting a sealing strip on to a motor vehicle door opening, will now be described, by way of example only, with reference to the accompanying drawings in which.

DESCRIPTION OF PREFERRED EMBODIMENTS

Figure 1:
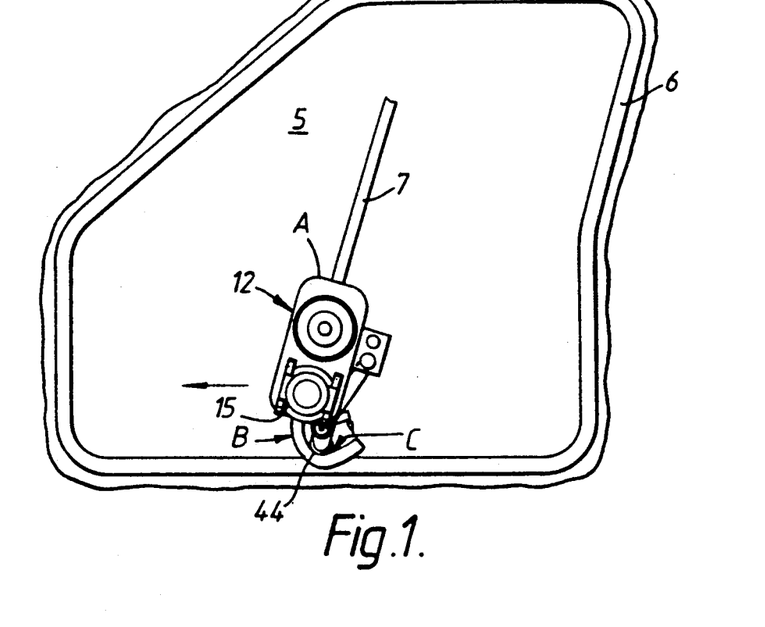
FIG. 1 is a side view of the door opening, showing one form of the apparatus in diagrammatic form.
Figure 2:
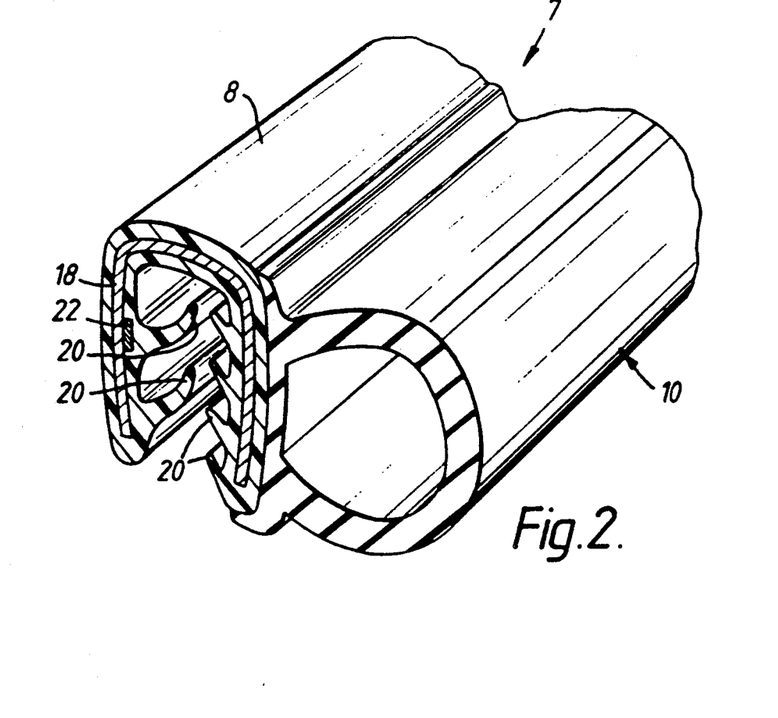
FIG. 2 is an enlarged perspective view of the sealing strip with its end sectioned.
Figure 3:
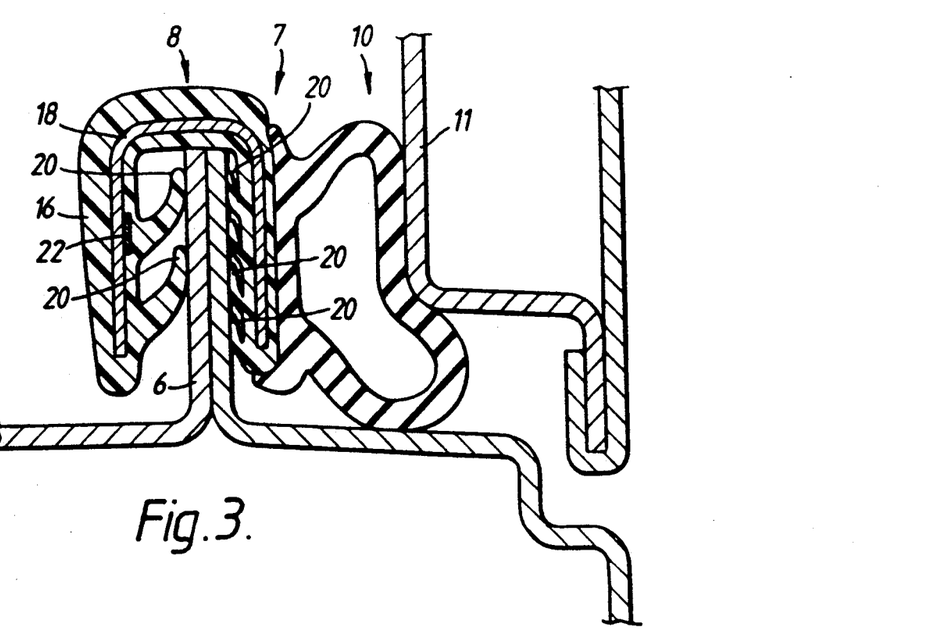
FIG. 3 is a cross-section of the sealing strip fitted on to a flange surrounding the openings.

FIG. 1 shows a door opening 5 of a motor vehicle body to which a door seal is to be fitted. As shown in FIG. 2, the door seal comprises a channel-shaped gripping section 8 which, in use, embracingly grips the flange 6 and supports a soft tubular sealing section 10, so that the seal runs around the door opening, with the sealing section on the outside of the opening. As shown in FIG. 3, when the door, part of which is shown diagramatically at 11, closes onto the opening, it partially-compresses the tubular sealing section 10 so as to form a weather-proof seal. The apparatus and method now to be described are concerned with the automatic fitting of the door seal 7 onto the flange 6.

The apparatus comprises two parts: a robot hand 12 as shown in FIG. 1, and a robot arm (not shown), the robot arm supporting the hand 12 by being attached to a fixture 15. The fixture 15 is best shown in FIG. 4.

In a manner to be described, a free end of a length of the seal 7 (whose length is sized to fit the periphery of the door opening) is fed into the hand as shown at A in FIG. 1 and the hand automatically grips it and presents the open mouth of the channel of the gripping section 8 towards the flange 6 as shown at B. The robot arm is programmed to move the hand 12 (under control of robot drive means not shown) towards the flange so that the gripping section grippingly embraces the flange 6 as shown at C. Thereafter, the robot arm moves the robot hand 12 around the periphery of the door opening and at an appropriate distance from the flange 6. During this movement, the hand automatically and continuously feeds the length of door seal onto the flange 6 until the hand has travelled around the complete periphery of the door opening. At the completion of this travel, the distal end of the door seal will be placed in position on the flange immediately adjacent to the initial end. As the robot arm drives the robot hand 12 around the periphery, it automatically adjusts the angular position of the hand to take account of the corners and bends in the periphery and so that the angle of approach of the seal 7 is appropriate at all positions.

As shown more clearly in FIG. 3, the gripping section 8 is made of plastics or rubber material 16 which is extruded over a channel-shaped metal carrier 18. The extruded material 16 is extruded to form gripping and sealing lips 20 on the inside facing walls of the channel, and these make gripping and sealing contact with the side surfaces of the flange 6. The metal carrier may take any suitable form. For example, it may comprise a series of U-shaped metal elements arranged adjacent to each other to define a channel and either connected together by flexible connecting links or completely disconnected from each other. Instead, however, it may comprise wire looped to and fro and extending along the length of the channel. However, other forms of carrier can be used instead. The gripping section may incorporate a substantially inextensible tape or thread 22.

Figure 4:
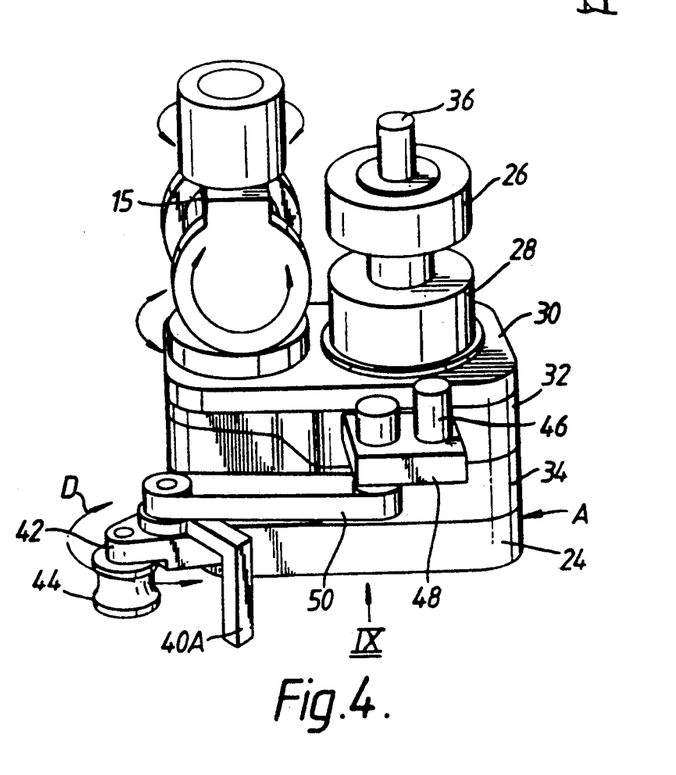
FIG. 4 is perspective enlarged view of one form of a robot hand forming part of the apparatus.

As shown in FIG. 4, the robot hand 12 comprises a seal drive section 24 containing three pairs of rollers (to be described below) which grip the sides of the seal and are driven so as to feed the seal longitudinally through the hand. These rollers are driven by a main motor 26 via a reduction gearbox 28. The drive shaft from the latter passes through a lid 30 to a belt driving section 32 which distributes the drive from the gearbox output shaft via a drive belt, to the three pairs of rollers in the seal drive section 24. The drive shafts from the belt driving section 32 to the pairs of drive rollers in the seal drive section 24 are supported in bearings in a bearing section 34.

A tachogenerator 36 monitors the speed of the motor 26.

In a manner to be explained, the seal enters the seal drive section 24 at A and emerges at the opposite end of the section. At the exit point, guide finger 40A is positioned. Guide finger 40A is pivotally mounted on an arm 42 extending from the body of the seal drive section 24. The locus of the guide finger 40A is shown by the dotted line D. Initially, the guide finger 40A is positioned so that it is adjacent to the point where the seal emerges.

Figure 5:
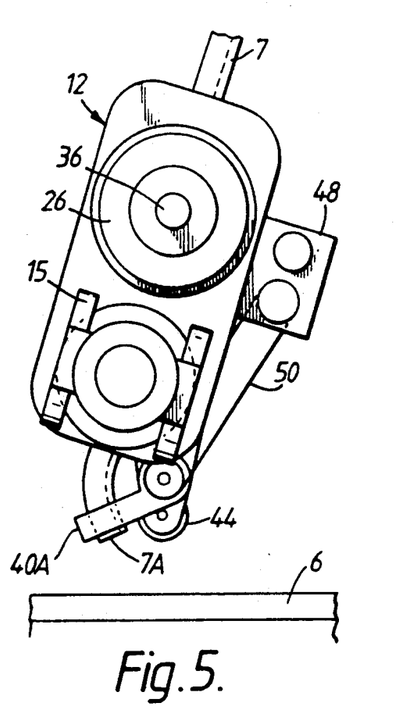
FIG. 5 is a side view of the robot hand of FIG. 4 in the operational state immediately before the strip is placed on to the flange.
Figure 6:
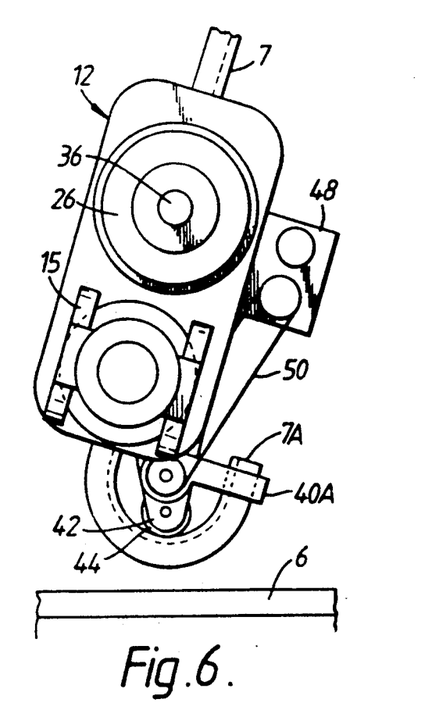
FIG. 6 corresponds to FIG. 5 and shows a later operational state.

The purpose of the right-angled finger 40A is to guide the initial end of the seal 7 in a curved path as it emerges from the robot hand. As shown in FIG. 5, the emerging initial end 7A of the seal 7 contacts the finger 40A. As the seal continues to emerge, it is forced to follow a curved path defined by the locus of the guide finger 40A as it rotates about its pivot point on the arm 42. The seal is held in contact with the guide finger 40A by its own resilience. This process continues until the guide finger 40A reaches the position shown in FIG. 6, the seal following a substantially circular path and in contact with a roller 44.

Figure 7:
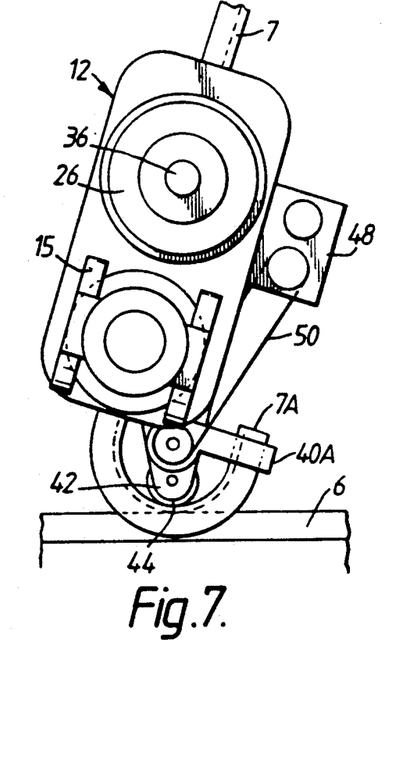
FIG. 7 corresponds to FIG. 6 but shows a following operational state.
Figure 8:
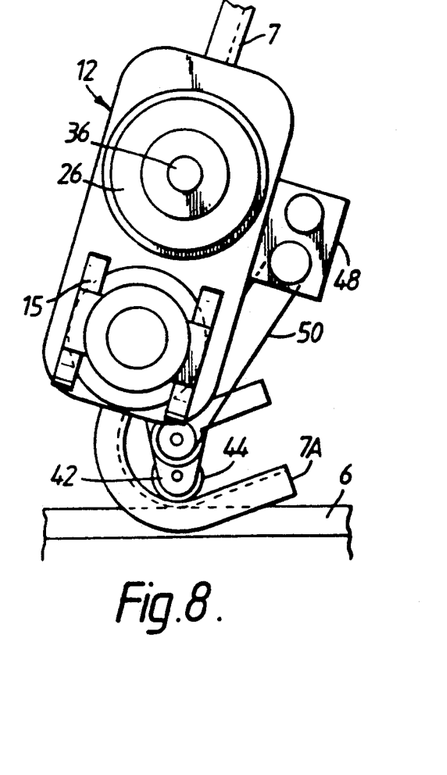
FIG. 8 corresponds to FIG. 7 but shows a still later operational state.
Figure 9:
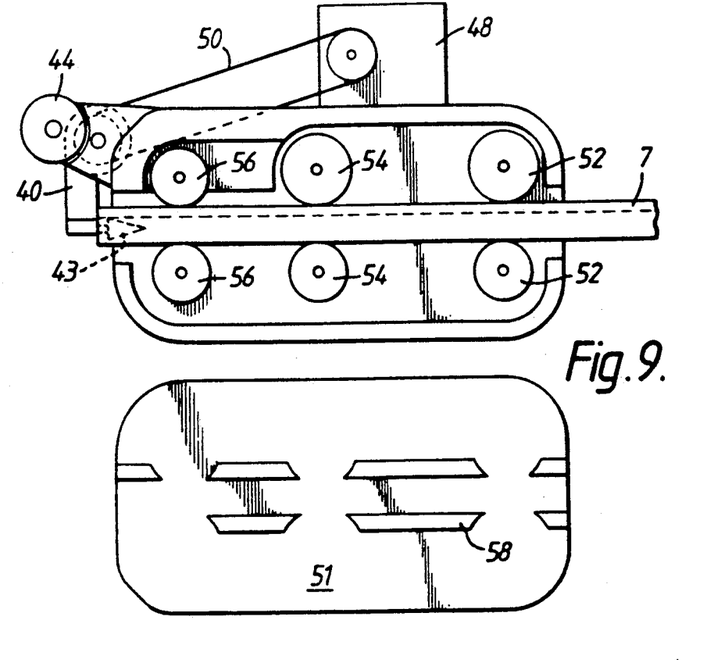
FIG. 9 is a view looking in the direction of the arrow IX of FIG. 4.

The robot arm now moves the robot hand 12 closer towards the flange 6 and the guide roller 44 presses the gripping section 8 on to the flange as shown in FIG. 7. The guide finger 40A is thereafter accelerated away from the end of the seal, this being carried out by means of a motor 46, a gear box 48 and a belt 50, as shown in FIG. 9.

The robot arm then commences to drive hand 12 around the periphery of the door opening. During this process, the seal driving section 24 drives the seal through the hand at an appropriate rate, and the gripping section is thus laid firmly onto the flange by being guided and pressed on to the flange by the roller 44.

When the robot hand 12 has been driven completely around the door opening, the distal end of the seal will pass through the seal drive section 24 and will be laid onto the flange 6 adjacent to the initial end.

The motor 46 (FIG. 4) is then energised so as to return the guide finger 40 to its initial position ready to receive a length of seal for the next door opening.

FIG. 9 shows a view of the underside of the robot hand 12, looking in the direction of the arrow IX in FIG. 4, and with a base 51 removed. This Figure shows the three pairs of rollers 52,54 and 56 between which the seal 7 is gripped and driven longitudinally through the unit 12 as the rollers rotate. The base 51 is formed with raised guide portions 58 so as to guide the seal 7 successively from one pair of rollers to the next on initial pick-up.

Figure 10:
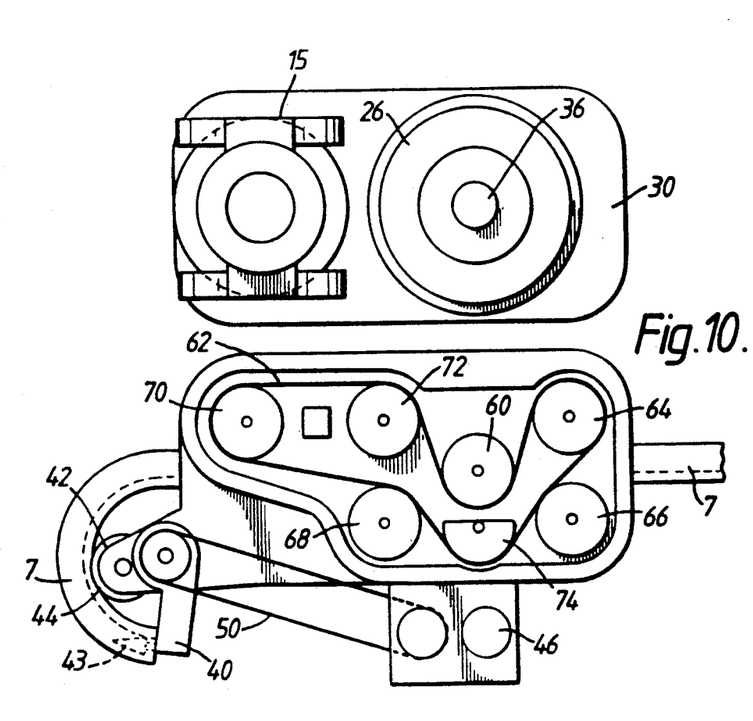
FIG. 10 is a partially dismantled view of the robot hand.
Figure 11:
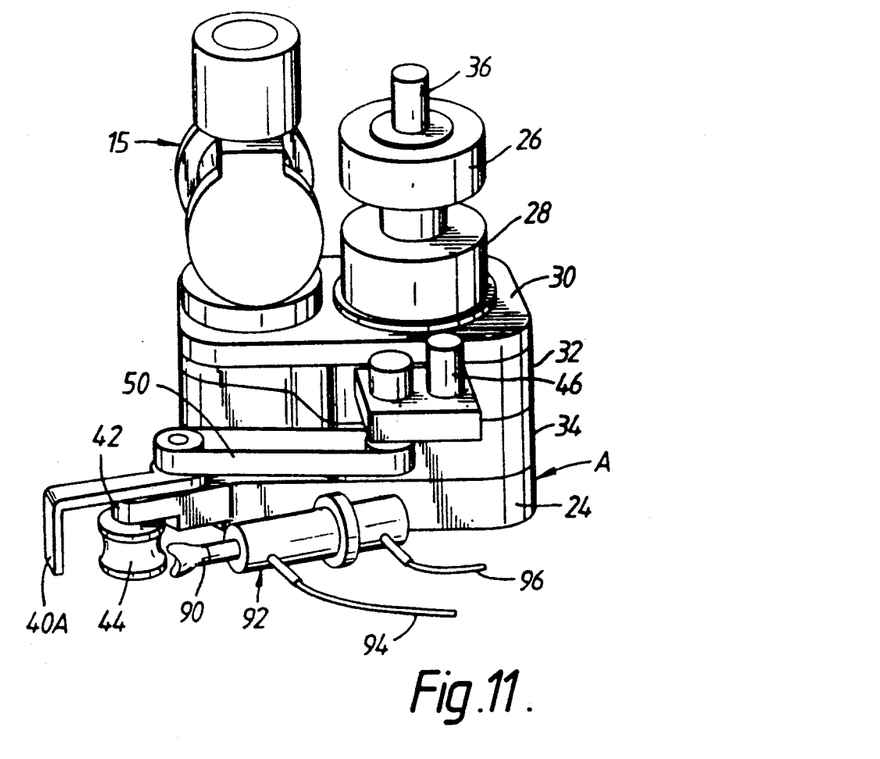
FIG. 11 is a perspective view corresponding to FIG. 4 but showing a modified form of the robot hand.

FIG. 10 shows a view of the robot hand 12 with the motor 26, the gearbox 28 and the lid 30 removed. As is clearly shown here, a main drive roller 60 is driven by the output shaft of the gearbox 28 and frictionally drives a continuous drive belt 62. Drive belt 62 passes successively around the drive rollers 64,66,68,70 and 72. In addition, it passes around a spring-loaded belt tensioner 74. It will be apparent that, by means of suitable drive shafts passing through the bearing unit 34 (FIG. 4), drive rollers 64 and 66 rotate the pair of seal drive rollers 52 in the seal drive section 24, drive rollers 68 and 72 respectively drive the seal drive rollers of the pair 54, and roller 70 drives one of the pair of seal drive rollers 56, the other one thereof being freely rotatable.

Advantageously, the speed of the seal drive rollers 50, 52 and 54 is such, in relation to the angular movement of the robot arm, that the seal 7 is slightly compressed, lengthwise, as it is laid on the flange 6. This helps to offset the stretching effect which might otherwise occur and which would have the undesirable effect of laying the door seal partially under tension. If it were laid under tension, it would gradually resile over a period of time and this would have the effect that the two ends of the seal would part, leaving an unsightly gap and with defective weather sealing. This is avoided by laying the seal slightly compressed. The nominal length of the seal is predetermined taking this compression into account, so that the ends of the seal are fitted in contact each other.

There may be less than three pairs of drive rollers.

The length of seal is supported in any suitable way, for example on the robot hand or the robot arm, during the fitting process.

The belt 50, and other moving parts of the robot hand would in practice be enclosed within protective coverings.

FIG. 10 shows a modified form of the robot hand of FIG. 4. The robot hand of FIG. 10 is identical with that of FIG. 4 except for the addition of a plunger 90 which is attached to a piston slidable within a pneumatically or hydraulically controlled cylinder assembly 92. The plunger 90 can be caused to extend away from the cylinder 92 or to retract towards it by means of pneumatic or hydraulic supply lines 94 and 96. The cylinder assembly 92 is fixed to the side of the drive section 24 by means not shown.

In operation, the plunger 90 is initially completely retracted into the cylinder 92. The seal 7 then emerges from the robot hand 12 and is guided round the roller 44 by the guide finger 40A, all as described above in FIGS. 5 to 8. During this process, the plunger 90 plays no part and, because it is fully retracted, is clear of the seal and the guide finger 40A. The robot hand then places the seal on the flange and travels around the flange in the manner already described, placing the seal on the flange.

Figure 12:
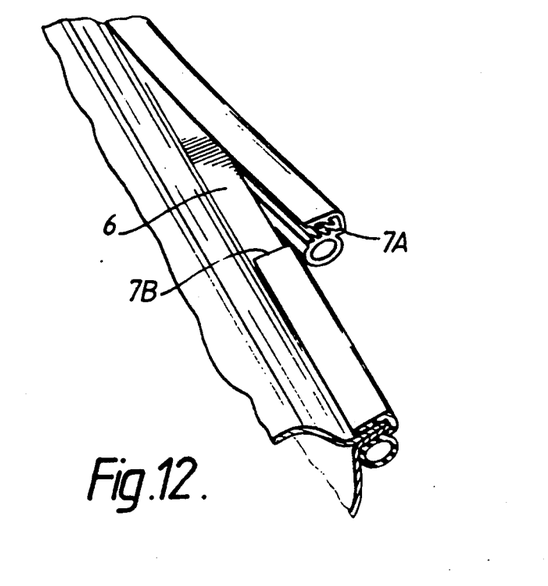
FIG. 12 shows part of the strip as applied to the door opening.

Eventually, the hand will have travelled completely around the door opening and will have laid the final end 7B of the seal on the flange as shown in FIG. 12. As shown in FIG. 12 (which omits the robot hand), the final end 7B is of course laid adjacent to the initial end 7A. However, the initial end 7A and the immediately adjacent part of the seal are clear of the flange because of the manner in which the robot hand applies the seal to the flange, see FIGS. 7 and 8).

Figure 13:
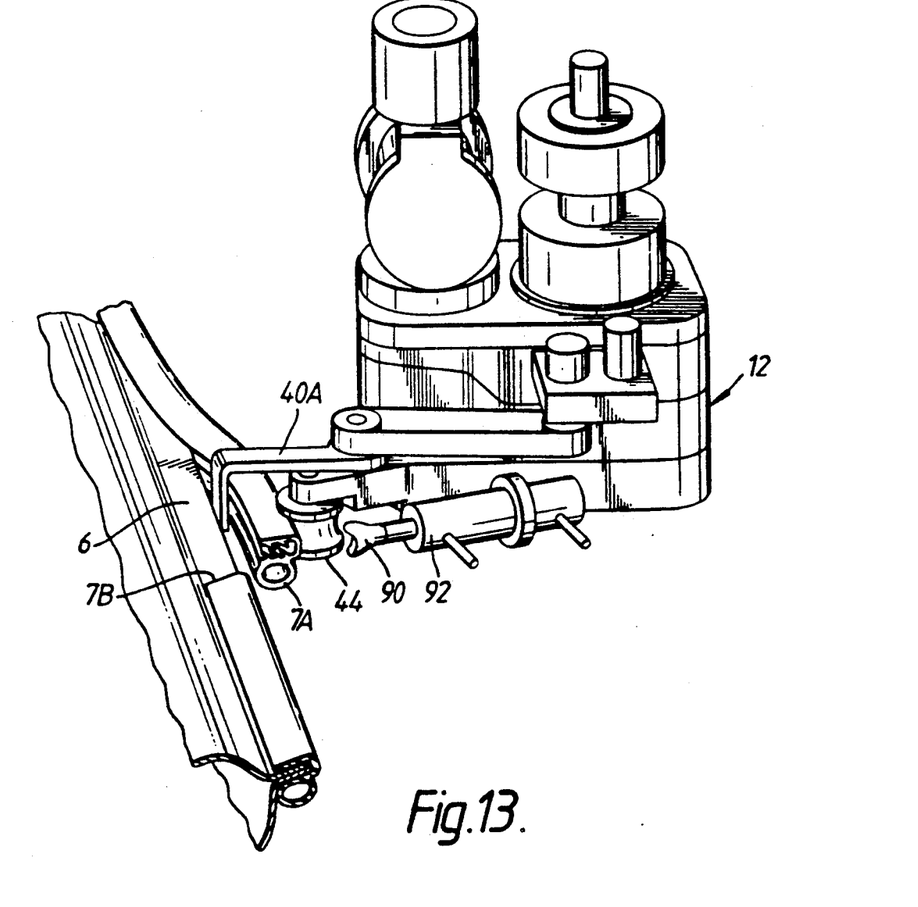
FIG. 13 is a perspective view of the robot hand of FIG. 11 applying the end of the sealing strip on to the flange.

The robot hand 12 then approaches the initial end 7A again, and at the same time the guide finger 40A is partially rotated by its drive motor 46 to the position shown in FIG. 13 so that the guide finger passes between the end 7A of the seal and the flange 6, with the roller 44 engaging the outside surface of the gripping section 8.

Figure 14:
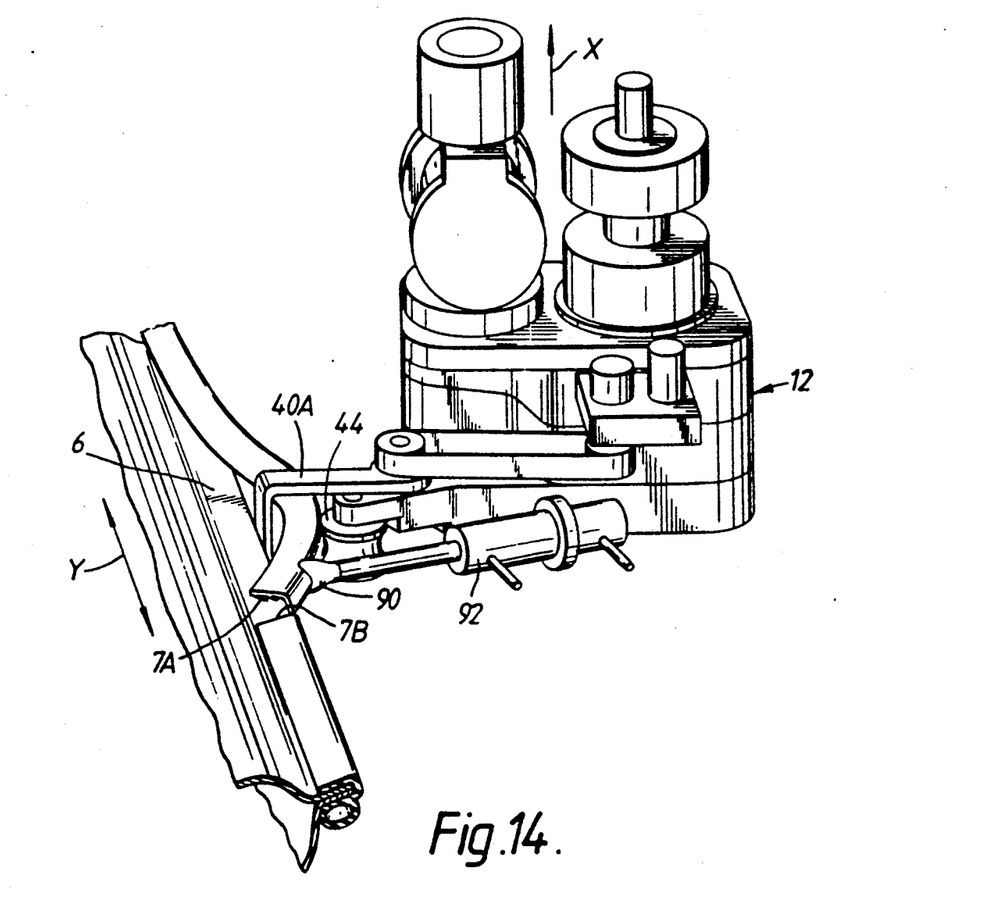
FIG. 14 corresponds to FIG. 13 but shows a later operational state.

Thereafter, the robot hand moves slightly away from the flange 6 as shown in FIG. 14, to pull the seal away from the flange, and plunger 90 is caused to extend from the cylinder 92 so that it engages the initial end 7A of the seal and presses it on the flange immediately adjacent to the final end 7B. Plunger 46 is then retracted, the seal retaining itself on the flange by the gripping action of the gripping section. The robot hand is then moved a short distance in a direction perpendicular to the flange 6, in the direction of the arrow X (FIG. 14) to bring the guide finger 40A clear of the seal. During this Process, the robot hand can also move slightly in a direction parallel to the flange (in the direction of arrow Y) to bring the roller 44 clear of the gripping section. The guide finger 40A is then rotated by the motor 46 into the position shown in FIG. 8. Finally, the robot hand is moved back into the position in which the roller 44 engages the gripping section 8 and then moves to and fro parallel to the flange so as to press the initial end 7A of the seal into complete engagement with the flange so that the two ends of the seal abut each other.

In order for this fitting process to be most effective, the sealing strip should advantageously be slightly compressible lengthwise and should have a length which is slightly greater than the peripheral length of the flange.

We claim:

1. A method of mounting an elongate resilient strip onto a mounting flange, the mounting flange defining a closed loop, the strip being of open-mouthed channel-shape and compressible lengthwise, comprising the steps of selecting a length of the strip having an initial end and a final end and a distance therebetween slightly greater than the peripheral length of said closed loop, feeding the strip longitudinally towards the flange, initial end first, in a direction which is transverse to the length of the flange and which lies in a general plane of the flange, constraining the initial end of the strip to follow a curved path as it approaches the flange as a result of the feeding step, the curved path lying in the general plane of the flange and having an initial part, an intermediate part, and a final part, the initial part being aligned with the direction of feeding of the strip in the feeding step and receiving the strip from the feeding step, the intermediate part being tangential to a line which is substantially parallel to the flange and which is closely adjacent but spaced from the flange, and the final part being directed away from the flange, the feeding step causing the strip to be fed along the curved path so that the part of the strip which is present in the intermediate part of the curved path presents the mouth of the channel to face outwardly of the curvature of the curved path and towards but spaced from the flange, moving the curved path bodily towards the flange when the initial end of the strip has reached the final part of the curved path, so that the part of the strip which is at that time in the intermediate part of the curved path moves into embracing relation with the flange but the initial end of the strip which is present in the final part of the curved path is clear of the flange, continuing to move the strip longitudinally into the curved path and at the same time transporting the curved path, together with the strip therein, along the length of the flange so that successive parts of the strip entering the intermediate part of the curved path are pressed into embracing relation with the flange and the initial end of the strip in the final part of the curved path remains clear of the flange, when the final end of the strip has been pressed into embracing relation with the flange, mechanically lifting from the flange the part of the strip which corresponds to that which lay in the intermediate part of the curved path when the initial end of the strip first reached the final part of the curved path, then pressing the initial end of the strip into embracing engagement with the flange and immediately adjacent to the final end of the strip on the flange, and then pressing onto the flange the mechanically lifted part of the strip.

* * * * *